(12) United States Patent
Montcalm

(10) Patent No.: US 11,574,348 B2
(45) Date of Patent: Feb. 7, 2023

(54) JOB-SPECIFIC CONTACT CENTER GENERATION

(71) Applicant: Mitel Networks Corporation, Ottawa (CA)

(72) Inventor: Michael Montcalm, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 109 days.

(21) Appl. No.: 16/435,414

(22) Filed: Jun. 7, 2019

(65) Prior Publication Data

US 2020/0387943 A1 Dec. 10, 2020

(51) Int. Cl.
*G06Q 30/04* (2012.01)

(52) U.S. Cl.
CPC .................................. *G06Q 30/04* (2013.01)

(58) Field of Classification Search
CPC ..... G06Q 30/04; G06Q 10/1053; G06Q 10/06
See application file for complete search history.

(56) References Cited

U.S. PATENT DOCUMENTS

| | | | | |
|---|---|---|---|---|
| 6,301,574 B1 * | 10/2001 | Thomas | ................. | G06Q 40/04 705/37 |
| 6,675,151 B1 * | 1/2004 | Thompson | ..... | G06Q 10/063112 705/7.14 |
| 7,096,193 B1 * | 8/2006 | Beaudoin | ......... | G06Q 10/06311 705/26.1 |
| 7,421,372 B1 * | 9/2008 | Moss | ..................... | G06Q 10/06 702/184 |
| 7,587,336 B1 * | 9/2009 | Wallgren | ............... | G06Q 40/04 718/107 |
| 7,853,472 B2 * | 12/2010 | Al-Abdulqader | .......................... | G06Q 10/06311 705/7.13 |
| 8,706,569 B2 * | 4/2014 | Al-Abdulqader | .......................... | G06Q 30/0641 705/27.1 |
| 9,232,064 B1 * | 1/2016 | Skiba | ............. | G06Q 10/063112 |
| 9,721,280 B2 * | 8/2017 | Allin | ...................... | G06Q 10/06 |
| 10,068,304 B1 * | 9/2018 | Shuklabaidya | ........ | G06Q 50/26 |
| 10,152,695 B1 * | 12/2018 | Chiu | .................. | G06Q 10/1053 |
| 10,489,745 B1 * | 11/2019 | Verroios | ................. | G06F 17/18 |
| 10,733,571 B2 * | 8/2020 | Potratz | ................. | G06Q 10/105 |

(Continued)

FOREIGN PATENT DOCUMENTS

| CA | 2953305 A1 * | 6/2017 | ....... G06F 16/24575 |
|---|---|---|---|
| JP | 2002288456 A * | 10/2002 | |

(Continued)

OTHER PUBLICATIONS

Lew, Yoke-Lian et al. "Structural Equation Modelling for Subcontracting Practice: Malaysia Chapter." Engineering, construction, and architectural management 25.7 (2018): 835-860. Web. (Year: 2018).*

*Primary Examiner* — Ashford S Hayles

(57) ABSTRACT

Systems and methods for the generation of job-specific contact centers are disclosed. The system may enable customers to generate a contact center during a job bidding phase and/or during pendency of the job. The contact center may enable communications between the customer and one or more contractors. The generated contact center may be both customer specific and job specific. The contact center may include any suitable communication technology, including an interactive voice response (IVR) system.

17 Claims, 5 Drawing Sheets

(56) References Cited

U.S. PATENT DOCUMENTS

| | | | | |
|---|---|---|---|---|
| 10,841,428 B2* | 11/2020 | McCoy | | G06Q 30/016 |
| 10,990,931 B2* | 4/2021 | Abramovici | | G06Q 10/06393 |
| 2001/0018670 A1* | 8/2001 | Tan | | G06Q 10/087 705/26.8 |
| 2002/0002476 A1* | 1/2002 | Mitsuoka | | G06Q 40/04 705/7.14 |
| 2003/0101127 A1* | 5/2003 | Cornelius | | G06Q 40/04 705/37 |
| 2003/0167229 A1* | 9/2003 | Ludwig | | G06Q 20/102 705/40 |
| 2004/0107192 A1* | 6/2004 | Joao | | G06Q 10/10 |
| 2005/0071241 A1* | 3/2005 | Flockhart | | H04M 3/5233 705/26.1 |
| 2005/0221796 A1* | 10/2005 | Pellegrino | | H04W 4/90 455/410 |
| 2005/0222942 A1* | 10/2005 | Pheil | | G06Q 10/087 705/28 |
| 2005/0278206 A1* | 12/2005 | Choper | | G06Q 10/06 705/7.14 |
| 2006/0185230 A1* | 8/2006 | Nablo | | A01G 13/0268 47/31 |
| 2006/0229896 A1* | 10/2006 | Rosen | | G06Q 10/1053 705/321 |
| 2007/0055634 A1* | 3/2007 | Albertao | | G06Q 20/383 705/74 |
| 2007/0073610 A1* | 3/2007 | Marugabandhu | | G06Q 40/04 705/37 |
| 2008/0120125 A1* | 5/2008 | Chavez | | G06Q 30/0204 707/999.107 |
| 2008/0120152 A1* | 5/2008 | McCrea | | G06Q 30/0201 705/7.29 |
| 2008/0270149 A1* | 10/2008 | Cirulli | | G06Q 10/0631 705/1.1 |
| 2009/0070126 A1* | 3/2009 | MacDaniel | | G06Q 10/1053 705/321 |
| 2009/0177518 A1* | 7/2009 | Adams | | G06Q 10/06311 705/7.14 |
| 2009/0187501 A1* | 7/2009 | Winter | | G06Q 30/08 705/34 |
| 2010/0161495 A1* | 6/2010 | Olson | | G06Q 50/165 705/400 |
| 2011/0047090 A1* | 2/2011 | Sarusi | | G06Q 30/08 705/321 |
| 2011/0131120 A1* | 6/2011 | Sciuk | | G06Q 10/063112 705/34 |
| 2011/0137730 A1* | 6/2011 | McCarney | | H04M 3/42289 705/14.58 |
| 2011/0196868 A1* | 8/2011 | Hans | | H04M 1/27475 455/418 |
| 2011/0276356 A1* | 11/2011 | Smith | | G06Q 30/08 705/321 |
| 2011/0276507 A1* | 11/2011 | O'Malley | | G06Q 10/00 705/321 |
| 2012/0123956 A1* | 5/2012 | Chenthamarakshan | | G06Q 10/1053 705/321 |
| 2013/0332380 A1* | 12/2013 | Kruglick | | G06Q 10/1053 705/321 |
| 2014/0032436 A1* | 1/2014 | Patel | | G06Q 10/1053 705/321 |
| 2014/0058954 A1* | 2/2014 | Perlstein | | G06Q 50/188 705/80 |
| 2014/0172479 A1* | 6/2014 | Gallagher | | G06Q 10/063114 705/7.15 |
| 2014/0249975 A1* | 9/2014 | Schmidt | | G06Q 40/08 705/34 |
| 2014/0278652 A1* | 9/2014 | Joyner | | G06Q 10/063116 705/7.16 |
| 2014/0279571 A1* | 9/2014 | Cox | | G09B 29/007 705/305 |
| 2014/0279634 A1* | 9/2014 | Seeker | | G06Q 10/1053 705/321 |
| 2015/0066792 A1* | 3/2015 | Sprague | | G06Q 10/1053 705/321 |
| 2015/0199723 A1* | 7/2015 | Petrean | | G06Q 30/0267 705/14.54 |
| 2015/0356510 A1* | 12/2015 | Campesi | | G06Q 10/1053 705/321 |
| 2015/0356511 A1* | 12/2015 | Campesi | | G06Q 10/1053 705/321 |
| 2016/0350881 A1* | 12/2016 | Katave | | G06Q 50/08 |
| 2016/0371703 A1* | 12/2016 | Monegan | | H04L 67/148 |
| 2017/0024833 A1* | 1/2017 | Katave | | G06Q 10/103 |
| 2017/0116575 A1* | 4/2017 | DeGoler | | G06Q 10/1053 |
| 2017/0270575 A1* | 9/2017 | Muturia | | G06Q 30/0601 |
| 2018/0060823 A1* | 3/2018 | Garimella | | G06Q 10/1053 |
| 2018/0310142 A1* | 10/2018 | Samdani | | H04L 51/046 |
| 2018/0341896 A1* | 11/2018 | Grimes | | G06Q 10/06313 |
| 2019/0028587 A1* | 1/2019 | Unitt | | G06Q 30/016 |
| 2019/0108603 A1* | 4/2019 | Waslander | | G06Q 30/0283 |
| 2019/0253430 A1* | 8/2019 | Gamache | | H04L 63/0853 |
| 2020/0342413 A1* | 10/2020 | Potratz | | G06Q 10/105 |
| 2021/0103894 A1* | 4/2021 | Kim | | G06F 40/174 |

FOREIGN PATENT DOCUMENTS

| | | | | |
|---|---|---|---|---|
| KR | 20100104831 A | * | 9/2010 | |
| KR | 20160090165 A | * | 2/2016 | |
| KR | 20160090165 A | * | 7/2016 | |
| KR | 20170057117 A | * | 5/2017 | |
| KR | 20180082329 A | * | 7/2018 | |
| WO | WO-2007045730 A1 | * | 4/2007 | G06Q 10/063118 |
| WO | WO-2008124627 A1 | * | 10/2008 | G06Q 10/06 |
| WO | WO-2010050926 A1 | * | 5/2010 | G06Q 10/06 |
| WO | WO-2013154580 A1 | * | 10/2013 | G06F 3/1203 |
| WO | WO-2015126868 A2 | * | 8/2015 | G06Q 10/06 |
| WO | WO-2019015786 A1 | * | 1/2019 | G06Q 10/0631 |

* cited by examiner

JOB-SPECIFIC CONTACT CENTER GENERATION

FIELD OF INVENTION

The present disclosure generally relates to electronic communication contact centers. More particularly, the disclosure relates to systems and methods suitable for the generation of job-specific contact centers.

BACKGROUND

Customers (e.g., individuals, companies, cities, etc.) may desire to hire one or more contractors to complete a job. A customer may initially contact one or more contractors to submit a bid or offer to complete the job. Typically, the customer manually gathers and reviews the bids or offers received from the contractors. In response to the customer selecting a contractor to complete the job, the customer and/or the selected contractor may manually coordinate contact information. For example, in response to the contractor needing various subcontractors, the contractor may manually provide the subcontractor contact information to the customer.

A contractor may incorporate a contact center to enable various customers to communicate with the contractor during bidding processes and/or throughout pendency of jobs. For example, in a contractor's contact center comprising an interactive voice response (IVR) system, the contractor may comprise a single contract phone number to enable all customers to contact the contractor. A technical problem is that creating and maintaining a contact center may require substantial and costly computing and communications infrastructure. As a result, many small businesses or individual contractors may be unable to offer a contact center as a means of communication with customers.

Any discussion of problems and solutions provided in this section has been included in this disclosure solely for the purposes of providing a context for the present invention and should not be taken as an admission that any or all of the discussion was known at the time the invention was made.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

Figure 1:
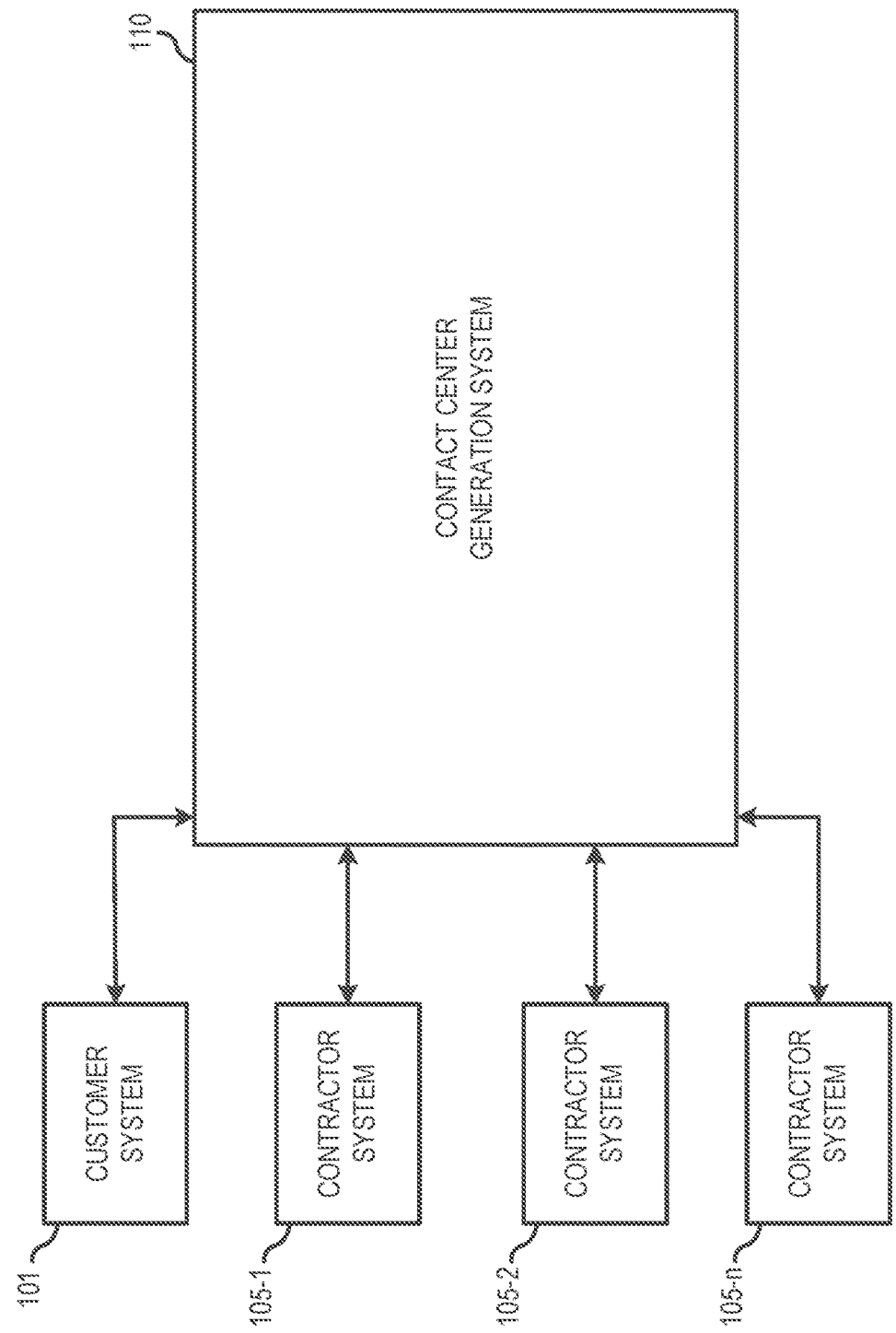
FIG. 1 is a block diagram illustrating various system components of a job-specific contact center generation system, in accordance with various embodiments.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, systems and methods for the generation of job-specific contact centers are disclosed. The system may enable customers to generate a contact center during a job bidding phase and/or during pendency of the job. In that regard, during the job bidding phase one or more contractors may join the generated contact center to submit bids for the customer's job. In response to the customer selecting a contractor to complete the job, the customer and the selected contractor may be added to the job contact center to enable communications between the parties. The contact centers may be accessible and at least partially editable by the customer and the contractor. For example, the contractor may edit the contact center to add employees, subcontractors, and the like.

In contrast to typical processes wherein one or more contractors are responsible for each providing a contact center to enable communications between the parties, the system may enable the generation of job specific, and per-job, contact centers to allow communications between a single customer and one or more contractors as part of a bidding process or job pendency.

In that regard, the system may provide a technical solution to the technical problem found in typical contact center solutions requiring substantial contractor-invested infrastructure. The system further improves the efficiencies of the computer-based systems typically involved for communications between the parties. For example, the system may centralize communications during the bidding process such that the customer may only need to access a centralized contact center to communicate with potential contractors and view previous communications between the parties. By centralizing the contact center, the system may decrease the need for customers and contractors to interact separately with and across different communications platforms. The customer and each contractor may therefore perform less computer functions and provide less input, which saves on data storage and memory which speeds processing compared to typical systems.

In various embodiments, and as discussed herein, a "customer" may refer to any individual, entity, city, municipality, or the like desiring to hire, or interact with, a contractor to complete a job. A "contractor" may refer to any individual, partnership, business, or the like desiring to complete, or bid for, a job for a customer. A contractor may also refer to a subcontractor (e.g., a first contractor may hire a second contractor to complete a sub-job for a primary job). A "job" may refer to any job, task, subtask, or the like. A job may comprise a project or a project may comprise several jobs. For example, a homeowner may desire to remodel a house by hiring a general contractor, or to fix an electrical problem by hiring an electrician. As a further example, a city may desire to hire a contractor, or a plurality of contractors, to build a public transit railway. The public transit railway may be supervised by a primary contractor, and the primary contractor may hire several subcontractors to complete the job.

In various embodiments, and with reference to FIG. 1, a system 100 for generating job-specific contact centers is disclosed. System 100 may comprise one or more customer systems 101, contractor systems 105, and/or contract center generation systems 110. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, customer system 101 may be in electronic communication with contact center generation system 110. Customer system 101 may be configured to enable a customer to access and interact with contact center generation system 110. For example, the customer may access and/or interact with contact center generation system 110 to generate a job creation contact center as part of a bidding process for a job. As discussed further herein, the job creation contact center may enable communications between the customer and one or more contractors during the bidding process. As a further example, in response to the customer selecting a contractor to complete a job, the customer, via customer system 101, may access and/or interact with contact center generation system 110 to generate a job contact center. As discussed further herein, the job contact center may enable communications between customer system 101 and the selected contractor throughout pendency of the job.

Customer system 101 may comprise any suitable device capable of communicating and interacting with contact center generation system 110. Customer system 101 may comprise any suitable hardware, software, database, and/or communication components. For example, customer system 101 may comprise a computer, a personal digital assistant, a telephone, a cellular phone, a smartphone (e.g., IPHONE®, BLACKBERRY®, etc.), an Internet of Things (IoT) device, and/or the like. Customer system 101 may comprise an operating system such as, for example, a WINDOWS® mobile operating system, an ANDROID® operating system, APPLE® IOS®, a BLACKBERRY® operating system, a LINUX® operating system, and the like. Customer system 101 may also comprise software components installed on customer system 101 and configured to allow customer system 101 access to various systems, services, and components in contact center generation system 110. For example, customer system 101 may comprise a web browser (e.g., MICROSOFT INTERNET EXPLORER®, GOOGLE CHROME®, etc.), an application, a micro-app or mobile application, or the like configured to allow customer system 101 to access and/or interact with contact center generation system 110.

In various embodiments, system 100 may comprise any suitable or desired number of contractor systems 105, such as, for example, a first contractor system 105-1, a second contractor system 105-2, and/or an "Nth" contractor system 105-n. Each contractor system 105 may be in electronic communication with contact center generation system 110. Each contractor system 105 may be configured to enable a contractor, subcontractor, contractor employee, or the like to access and/or interact with contact center generation system 110. For example, and as discussed further herein, during a bidding process one or more contractor systems 105 may receive pending job notifications from contact center generation system 110. The contractor systems 105 may access and/or interact with contact center generation system 110 to transmit job invoices based on the pending job notifications, to negotiate with the customer, to accept the pending job, and/or the like. In response to the customer selecting the contractor to complete a job, the contractor system 105 may access and/or interact with contact center generation system 110 to communicate with the customer during pendency of the job.

Each contractor system 105 may comprise any suitable device capable of communicating and interacting with contact center generation system 110. Each contractor system 105 may comprise any suitable hardware, software, database, and/or communication components. For example, Each contractor system 105 may comprise a computer, a personal digital assistant, a telephone, a cellular phone, a smartphone, an IoT device, and/or the like. Each contractor system 105 may comprise an operating system. Each contractor system 105 may also comprise software components installed on the contractor system 105 and configured to allow the contractor system 105 access to various systems, services, and components in contact center generation system 110. For example, Each contractor system 105 may comprise a web browser, an application, a micro-app or mobile application, or the like configured to allow the contractor system 105 to access and/or interact with contact center generation system 110.

In various embodiments, contact center generation system 110 may be configured provide job-specific contact centers to enable communications between a customer and one or more contractors throughout the lifecycle of a job. For example, contact center generation system 110 may be configured to provide a job creation contact centers during a job bidding process to enable a customer to communicate with potential contractors. Contact center generation system 110 may be configured to provide a job contact center to enable communications between the customer and a selected contractor, in response to the customer selecting the contractor to complete the job.

Contact center generation system 110 may be in electronic communication with customer system 101 and/or one or more contractor systems 105 (e.g., first contractor system 105-1, second contractor system 105-2, Nth contractor system 105-n, etc.). Contact center generation system 110 may comprise one or more hardware, software, and/or database components. For example, contact center generation system 110 may comprise one or more network environments, servers, computer-based systems, processors, databases, and/or the like. Contact center generation system 110 may comprise at least one computing device in the form of a computer or processor, or a set of computers/processors, although other types of computing units or systems may be used such as, for example, a server, web server, pooled servers, or the like. Contact center generation system 110 may also include software, such as services, APIs, and the like, configured to perform various operations discussed herein. In various embodiments, contact center generation system 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Contact center generation system 110 may comprise one or more communication systems or technologies configured to enable communications between customer system 101 and one or more contractor systems 105. For example, and in accordance with various embodiments, contact center generation system 110 may comprise a text-based communication technology such as an email system, a short message service (SMS) system, a chat system (e.g., instant messaging, chatbots, etc.), and/or the like. As a further example, and in accordance with various embodiments, contact center generation system 110 may comprise an automated telephony system, such as, for example, an interactive voice response (IVR) system. The IVR system may enable contact center generation system 110 to interact with customers, via customer system 101, and/or contractors, via contractor systems 105, through the use of voice and dual-tone multi-frequency (DTMF) tones input via a phone keypad by the customers or contractors. The IVR system may be configured to route the parties to a customer or contractor based on the input DTMF tone.

Figure 2:
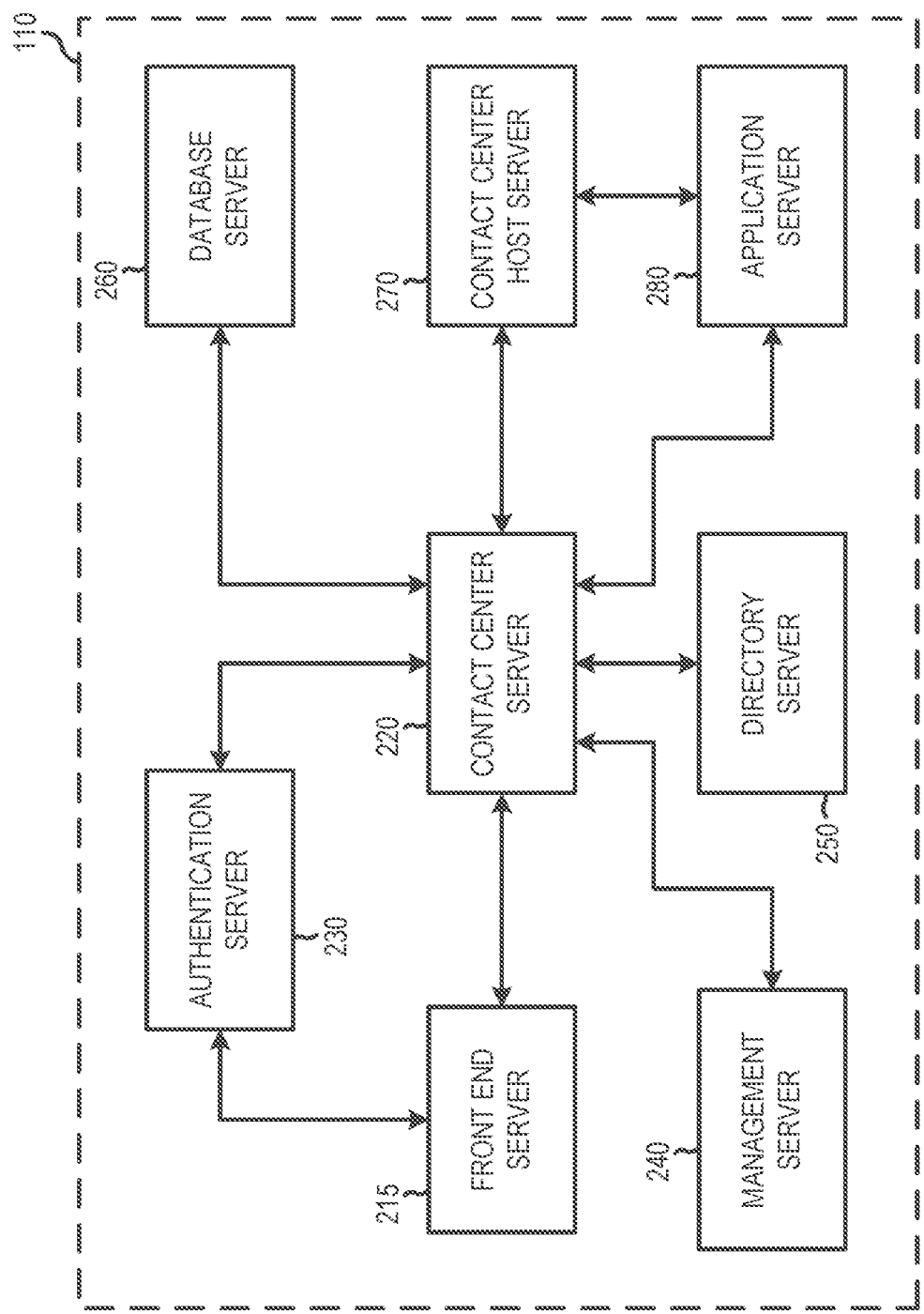
FIG. 2 is a block diagram illustrating various components of an exemplary contact center generation system for a job-specific contact center generation system, in accordance with various embodiments.

Contact center generation system 110 may comprise various subsystems, modules, databases, or the like configured to perform various subtasks of contact center generation system 110. In various embodiments, contact center generation system 110 includes a plurality of software modules that are stored in a computer-readable medium as a plurality of computer-executable instructions. Alternatively, or additionally, the modules may be implemented in hardware (such as one or more circuits) and/or firmware. One or more of the modules may comprise virtual or logical partitions of the computer-based system, and/or one or more of the modules may comprise logically distinct hardware and/or software based systems. For example, in accordance with various embodiments and with reference to FIG. 2, an exemplary contact center generation system 110 may comprise one or more front end servers 215, contact center servers 220, authentication servers 230, management servers 240, directory servers 250, database servers 260, contact center host servers 270, and/or application servers 280. Each of the front end servers 215, contact center servers 220, authentication servers 230, management servers 240, directory servers 250, database servers 260, contact center host servers 270, and/or application servers 280 may be collectively in communication with each other, or in direct communication as discussed further herein.

Front end server 215 may be in electronic communication with contact center server 220 and/or authentication server 230. Front end server 215 may be configured as an access point to enable customers and/or contactors access to contact center generation system 110. For example, front end server 215 may be configured to receive input from customer system 101 and/or contractor systems 105, transmit the input to contact center server 220 and/or authentication server 230, and provide output based on operations performed by authentication server 230 and/or contact center server 220, as discussed further herein. In various embodiments, front end server 215 may be a web server (e.g., Apache, IIS, GOOGLE® Web Server, SUN JAVA® System Web Server, JAVA® Virtual Machine running on LINUX® or WINDOWS® operating systems). In that regard, front end server 215 may be accessible by customer system 101 and/or contractor systems 105 via a web browser, mobile application, and/or any other suitable web-based user interface.

Contact center server 220 may be in electronic communication with front end server 215, authentication server 230, management server 240, directory server 250, database server 260, contact center host server 270, and/or application server 280. Contact center server 220 may be configured to orchestrate communications and the transfer of data between the various subcomponents of contact center generation system 110. In various embodiments, contact center server 220 may include a processor and a tangible, non-transitory memory and be capable of implementing logic. The processor may be configured to implement various logical operations in response to execution of instructions, for example, instructions stored on the tangible, non-transitory memory. For example, and as discussed further herein, contact center server 220 may be configured to transmit and receive data from front end server 215 and authentication server 230; transmit and retrieve data from management server 240, directory server 250, database server 260, contact center host server 270, and/or application server 280; and/or instruct contact center host server 270 to perform various operations (e.g., deploying job creation contact centers or job contact centers).

Authentication server 230 may be in electronic communication with front end server 215 and/or contact center server 220. Authentication server 230 may be configured to authenticate customers and contractors accessing contact center generation system 110. As used herein, "authenticate," or similar terms or phrases, may include an exact authentication, a partial authentication, authenticating a subset of data, a correspondence, satisfying certain criteria, an association, an algorithmic relationship, and/or the like. Authentication server 230 may be configured to authenticate customers and contractors using any suitable authentication method. For example, authentication server 230 may receive input customer credentials or contractor credentials from front end server 215 (e.g., in response to a customer or contractor attempting to login to access contact center generation system 110). Authentication server 230 may compare the input credentials against stored customer credentials or contractor credentials associated with stored customer accounts or contractor accounts from database server 260. In response to locating an at least partial match, authentication server 230 may authenticate the customer or contractor for access to contact center generation system 110.

Authentication server 230 may also be configured to transmit an authentication challenge to customer system 101 and/or a contractor system 105 as part of the authentication process. The authentication challenge may be transmitted via any suitable transmission channel (e.g., SMS, MMS, email, push notification, phone call, etc.). The authentication challenge may comprise a multi-factor authentication challenge. For example, if the customer or contractor previously registered with contact center generation system 110 using a biometric input, username and password, or the like, the authentication challenge may comprise data prompting the user to input the biometric input together with the customer's or contractor's password (e.g., a 2-factor authentication). Authentication server 230 may compare the received input against stored biometric data, username and password data, or the like (e.g., from database server 260) to validate the customer or contractor response and to authenticate the customer or contractor. As a further example, two-factor authentication may comprise sending an authentication number (e.g., a PIN, a code, a 6-digit number, a one-time password, etc.) via the transmission channel, and prompting the customer or contractor to input the authentication number into customer system 101 or the contractor system 105, respectively. Authentication server 230 may compare the input authentication number to the authentication number transmitted to the customer or contractor to validate the response and authenticate the customer or contractor.

Management server 240 may be in electronic communication with contact center server 220. Management server 240 may be configured to store, maintain, and manage data regarding jobs, job bids, job contracts, communications between the parties, and/or the like. The data may be grouped by and/or associated with a unique customer identifier (e.g., identifying the customer submitting the job) and/or a unique contractor identifier (e.g., identifying the contractor submitting the job bid or accepting the job). Management server 240 may comprise any suitable database, data structure, server, or the like capable of storing and maintaining data.

Database server 260 may be in electronic communication with contact center server 220. Database server 260 may comprise any suitable database, data structure, server, or the like capable of storing and maintaining data. Database server 260 may be configured to store and maintain customer account data and/or contractor account data. Each customer account may be assigned a customer identifier to uniquely identify the customer account record. Each contractor account may be assigned a contractor identifier to uniquely identify the contractor account record.

Directory server 250 may be in electronic communication with contact center server 220. Directory server 250 may comprise any suitable database, data structure, server, or the like capable of storing and maintaining data. Directory server 250 may be configured to store and maintain directory data for customer accounts and/or contractor accounts. For example, the directory data may comprise telephone numbers, email addresses, mailing addresses, and/or the like. The directory data may also comprise IVR workflows associated with a given contractor. The directory data may also comprise contractor employees, including contractor employee contact information. The directory data may be associated with the customer identifier or the contractor identifier corresponding to the customer or contractor that submitted the directory data.

Application server 280 may be in electronic communication with contact center server 220 and/or contact center host server 270. Application server 280 may be configured to host templates, applications, software, code, and the like for job creation contact centers, job contact centers, pending job notifications, job invoices, milestones, and/or the like. In various embodiments, application server 280 may comprise any suitable application server, such as, for example, those offered by WEBSPHERE®, WEBLOGIC®, JBOSS®, and/or POSTGRES PLUS ADVANCED SERVER®.

Contact center host server 270 may be in electronic communication with contact center server 220 and/or application server 280. Contact center host server 270 may be configured to host one or more job creation contact centers, job contact centers, and/or the like. For example, contact center host server 270 may be configured to provide computing resources needed to instantiate, deploy, and/or host the job creation contact centers and/or job contact centers. As discussed further herein, the job creation contact centers and/or job contact centers may be configured to enable communications between a customer and one or more contractors. The job creation contact centers and/or job contact centers may be hosted to comprise one or more communication technologies and systems, such as, for example an IVR system, an email system, a short message service (SMS) system, a chat system, and/or any other communication system. Contact center host server 270 may be configured to record conversations between the customer and the contractors, and transmits the recorded conversations to management server 240. For example, contact center host server 270 may comprise a natural language processing module configured to record and translate speech conversations completed over the IVR system. The recorded and translated-to-text conversation may then be stored in management server 240.

Any database, data structure, server, or the like discussed herein may include relational, hierarchical, graphical, blockchain, object-oriented structure, and/or any other database configurations. Any database, data structure, database server, or the like may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database, data structure, database server, or the like may be organized in any suitable manner, for example, as data tables or lookup tables. Each record may be a single file, a series of files, a linked series of data fields, or any other data structure.

One skilled in the art will also appreciate that any databases, systems, devices, servers, or other components of the system may consist of any combination thereof at a single location or at multiple locations. Each database, system, device, server, and/or other component may also include any of various suitable security features, such as firewalls, access codes, encryption, decryption, compression, decompression, and/or the like.

Further, any databases, systems, devices, servers, and/or transmitted communications over a network may utilize data encryption techniques or processes. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

Referring now to FIGS. 3-6 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-6, but also to the various system components as described above with reference to FIGS. 1 and 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Figure 3:
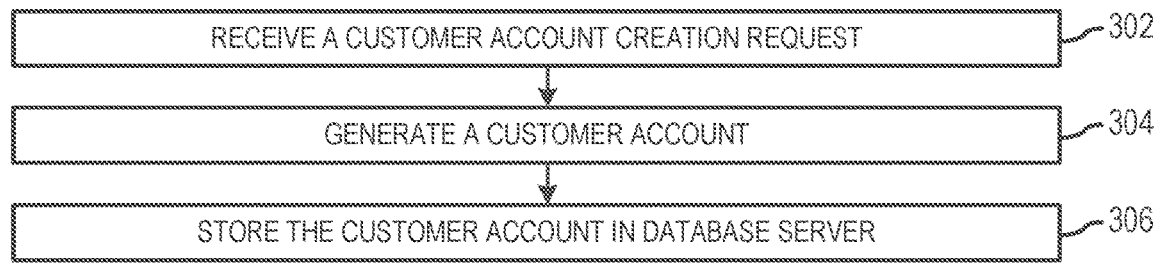
FIG. 3 illustrates a process flow for a method of generating a customer account, in accordance with various embodiments.

In various embodiments, and with reference to FIG. 3, a method 301 for generating a customer account for use in a job-specific contact center generation system is disclosed. The system may receive a customer account creation request (step 302). For example, customer system 101 may transmit the customer account creation request to contact center generation system 110, via front end server 215. The customer account creation request may be transmitted as part of an initial registration process. For example, a customer may desire to register with contact center generation system 110 to generate one or more job creation contact centers or job contact centers, as discussed further herein. The customer account creation request may comprise any suitable registration data, such as, for example, customer contact information (e.g., name, address, telephone number, email address, etc.), customer credentials (e.g., username and password, biometric input, etc.), and/or the like.

The system may generate a customer account (step 304) in response to receiving the customer account creation request. For example, front end server 215 may transmit the customer account creation request to contact center server 220. In response to receiving the customer account creation request, contact center server 220 may generate the customer account. Contact center server 220 may generate the customer account using any suitable method. The customer account may comprise the customer contact information and/or the customer credentials. The customer account may also be generated to comprise a customer identifier. The customer identifier may be configured to uniquely identify the customer account. In various embodiments, the customer account may also comprise a customer picture, a customer rating (e.g., based on ratings or reviews from one or more contractors), and/or any other additional customer data. The system may store the customer account in database server 260 (step 306). For example, in response to generating the customer account, contact center server 220 may transmit the customer account to database server 260. Database server 260 may store the customer account using any suitable technique and may encrypt the customer account in storage.

In various embodiments, in response to completing generation of the customer account, contact center generation system 110, via front end server 215, may return an account notification to customer system 101. The account notification may comprise data indicating that the customer account was successfully generated. In that regard, customer system 101 may transmit customer credentials to login to contact center generation system 110, and to access and/or interact with contact center generation system 110 as discussed further herein. In various embodiments, in response to being unable to complete the generation of the customer account (e.g., due to technical error, user error, etc.) contact center generation system 110, via front end server 215, may return an error notification to customer system 101. The error notification may comprise data indicating that the customer account was not successfully generated.

Figure 4:
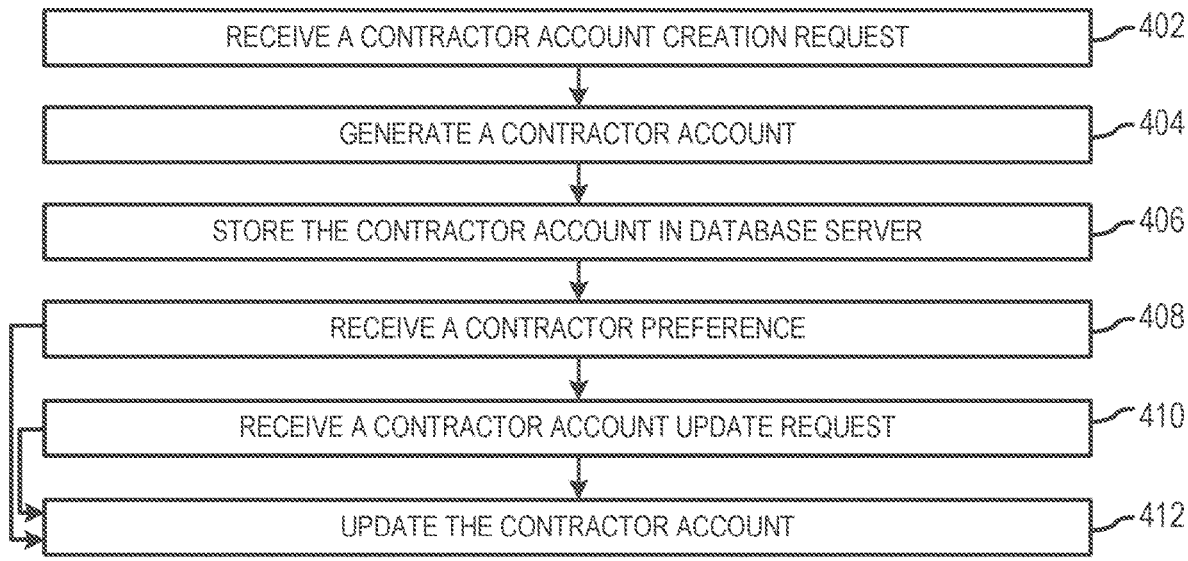
FIG. 4 illustrates a process flow for a method of generating a contractor account, in accordance with various embodiments.

In various embodiments, and with reference to FIG. 4, a method 401 for generating a contractor account for use in a job-specific contact center generation system is disclosed. The system may receive a contractor account creation request (step 402). For example, a contractor system 105 may transmit the contractor account creation request to contact center generation system 110, via front end server 215. The contractor account creation request may be transmitted as part of an initial contractor registration process. For example, a contractor may desire to register with contact center generation system 110 to access or interact with one or more job creation contact centers and/or job contact centers, to receive pending job notifications, and/or the like, as discussed further herein. The contractor account creation request may comprise any suitable registration data, such as, for example, contractor contact information (e.g., name, address, telephone number, email address, contractor website, etc.), contractor credentials (e.g., username and password, biometric input, etc.), and/or the like.

The system may generate a contractor account (step 404) in response to receiving the contractor account creation request. For example, front end server 215 may transmit the contractor account creation request to contact center server 220. In response to receiving the contractor account creation request, contact center server 220 may generate the contractor account. Contact center server 220 may generate the contractor account using any suitable method. The contractor account may comprise the contractor contact information and/or the contractor credentials. The contractor account may also be generated to comprise a contractor identifier. The contractor identifier may be configured to uniquely identify the contractor account. In various embodiments, the contractor account may also comprise a contractor picture, a contractor, a contractor rating (e.g., based on ratings or reviews from one or more customers), and/or any other additional contractor data. The system may store the contractor account in database server 260 (step 406). For example, in response to generating the contractor account, contact center server 220 may transmit the contractor account to database server 260. Database server 260 may store the contractor account using any suitable technique and may encrypt the contractor account in storage.

In various embodiments, in response to completing generation of the contractor account, contact center generation system 110, via front end server 215, may return an account notification to the contractor system 105. The account notification may comprise data indicating that the contractor account was successfully generated. In that regard, the contractor system 105 may transmit contractor credentials to login to contact center generation system 110, and to access and/or interact with contact center generation system 110 as discussed further herein. In various embodiments, in response to being unable to complete the generation of the contractor account (e.g., due to technical error, user error, etc.) contact center generation system 110, via front end server 215, may return an error notification to the contractor system 105. The error notification may comprise data indicating that the contractor account was not successfully generated.

The system may receive a contractor preference (step 408). Contractor system 105 may access contact center generation system 110 to transmit the contractor preference. For example, contractor system 105 may input contractor credentials to access contact center generation system 110, via front end server 215. In response to receiving the contractor credentials, front end server 215 may transmit the contractor credentials to authentication server 230. Authentication server 230 may authenticate the contractor credentials using any suitable method, such as, for example, by communicating with database server 260 to compare the input contractor credentials against stored contractor credentials.

In various embodiments, the contractor preference may comprise a contractor location. For example, the contractor location may comprise a service location that the contractor desires to complete jobs in, such as, for example, a zip code, a city, a state, a country, a geographic location, or the like. The contractor location may comprise a service radius (e.g., 5 miles, 25 miles, etc.) based on the service location. In various embodiments, the contractor preference may comprise one or more contractor specialties. For example, the contractor specialty may comprise service categories available from the contractor, such as, for example, general, electrical, plumbing, legal, and/or the like. Each contractor specialty may further comprise one or more contractor subspecialties. For example, a subspecialty may comprise a preference or license for residential or commercial jobs, a contractor license or certificate in a specialty or subspecialty, a level of education, or the like. A subspecialty in a legal specialty may comprise intellectual property law, employment law, and/or the like.

The system may receive a contractor account update request (step 410). A contractor system 105 may transmit the contractor account update request to contact center generation system 110, via front end server 215. The contractor account update request may comprise any desired updated to the contractor account. For example, the contractor account update request may be transmitted to add a contractor employee, and the contractor account update request may comprise employee data such as name, title, skills, contact information, etc. The contractor account update request may also comprise an IVR workflow. For example, in response to the contractor system 105 desiring to use the contractor's preexisting IVR workflow (or to generate an IVR workflow for use in the system), the contractor system 105 may upload or generate the IVR workflow. In that regard, in response to a customer contacting the contractor via a generated contact center, as discussed further herein, the customer may be directed to the contractor's IVR workflow for communication. The IVR workflow may be generated using any suitable technique or process.

The system may update the contractor account (step 412) based on the contractor preference and/or the contractor account update request. For example, in response to receiving the contractor preference and/or the contractor account update request, front end server 215 may transmit the contractor preference and/or the contractor account update request to contact center server 220. In response to receiving the contractor preference and/or the contractor account update request, contact center server 220 may transmit, update, and store the data in directory server 250. For example, contact center server 220 may store the contractor preference and/or the contractor account update request associated with the customer identifier to link the data to the customer account.

Figure 5:
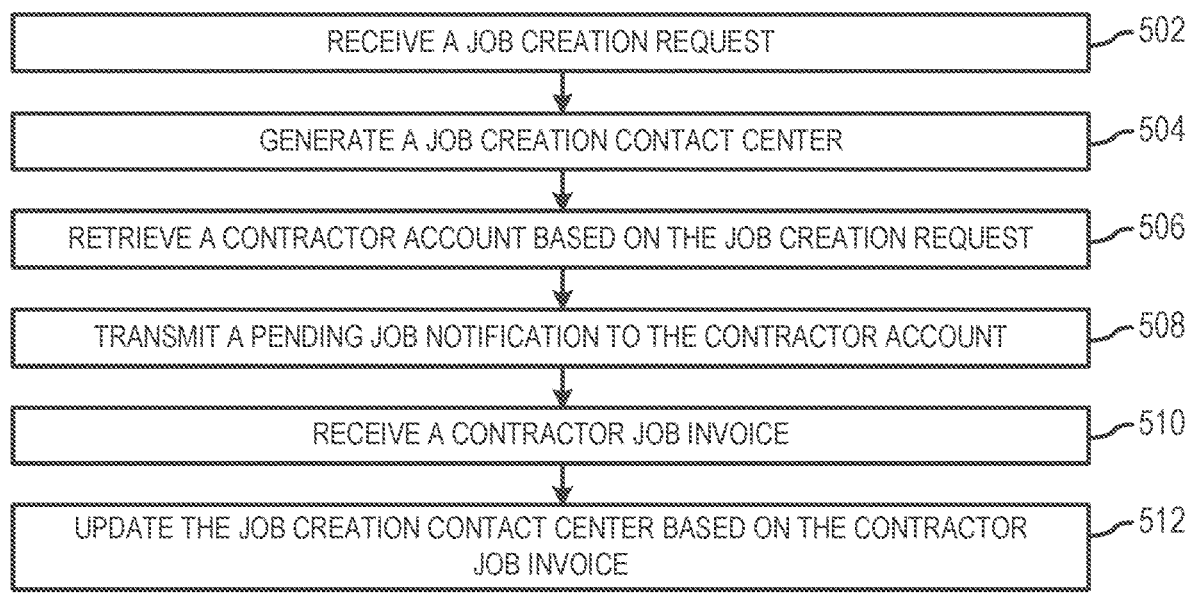
FIG. 5 illustrates a process flow for a method of generating a job creation contact center, in accordance with various embodiments.

In various embodiments, and with reference to FIG. 5, a method 501 for generating a job creation contact center is disclosed. The system may receive a job creation request (step 502). For example, a customer, via customer system 101, may transmit the job creation request to contact center generation system 110, via front end server 215. In various embodiments, customer system 101 may access contact center generation system 110 by inputting customer credentials generated as part of a customer account creation process (e.g., method 301, with brief reference to FIG. 3). In response to receiving the customer credentials, front end server 215 may transmit the customer credentials to authentication server 230. Authentication server 230 may authenticate the customer credentials using any suitable method, such as, for example, by communicating with database server 260 to compare the input customer credentials against stored customer credentials. In response to authenticating the customer, customer system 101 may be granted access to contact center generation system 110. In various embodiments, authentication server 230 may also implement multi-factor authentication protocols, and/or any other suitable authentication technique, to authenticate and authorize the customer.

The job creation request may comprise the customer identifier associated with the customer account, one or more desired contractor parameters, a job description, and/or the like. For example, the customer may transmit the job creation request in order to receive bids from various contractors to complete a job. The desired contractor parameters may be based on customer desires and/or properties of the job to be completed. For example, the desired contractor parameters may comprise a job description, a job time frame, a desired contractor location, a desired contractor rating, a specified contractor specialty, a specified contractor subspecialty, and/or any other suitable definable properties.

In response to receiving the job creation request, the system may generate a job creation contact center (step 504). The job creation contact center may be generated to enable communications between the customer and one or more contractors (and between each contractor and the customer) during a bidding process. The job creation contact center may be generated to comprise one or more communication technologies or systems. For example, and in accordance with various embodiments, the job creation contact center may comprise an interactive voice response (IVR) system.

As a further example, and in accordance with various embodiments, the job creation contact center may comprise an email system, a short message service (SMS) system, a chat system, and/or any other communication system. In that regard, the job creation request may specify one or more communication technologies to use in the job creation contact center.

Contact center generation system 110, via contact center server 220, may be configured to generate the job creation contact center using any suitable means. For example, contact center server 220 may query application server 280 to retrieve a contact center template. The contact center template may be based on the job creation request, such as, for example, based on the specified communication technology. The contact center template may comprise software (e.g., software packages, modules, executables, application programming interfaces (API), software development kits (SDK), etc.) necessary to instantiate and/or generate the job creation contact center. In response to retrieving the contact center template, contact center server 220 may generate the job creation contact center by instantiating or deploying the job creation contact center on contact center host server 270.

Contact center server 220 may generate the job creation contact center to comprise customer contact information associated with the customer identifier that submitted the job creation request. For example, contact center server 220 may retrieve the customer contact information from database server 260 and/or directory server 250. In a job creation contact center comprising an IVR system, contact center server 220 may generate an IVR workflow for the job creation contact center and may include the customer phone number as a prompt in the IVR workflow.

Contact center server 220 may generate the job creation contact center to be secured. For example, access to the job creation contact center may be protected by an access code (e.g., a customer access code, a contractor access code, etc.) assigned to the job creation contact center. The access code may comprise any secure code capable of securing access to the job creation contact center. For example, wherein the job creation contact center comprise an online portal, the access code may comprise any suitable alphanumeric string. In various embodiments, wherein the job creation contact center comprises an IVR workflow, access to the IVR workflow may be controlled by a phone number. For example, a customer or contractor may access the job creation contact center by dialing the assigned phone number. Input of the customer access code may provide a different IVR workflow than input of the contractor access code. The customer access code may be unique to the customer. The contractor access code may be unique to the contractor. For example, a customer may access the job creation contact center by dialing the customer access code. In response to being dialed, the job creation contact center may provide a customer-centric experience wherein the customer is prompted to select a contractor to communicate with. As a further example, a contractor may access the job creation contact center by dialing the contractor access code. In response to being dialed, the job creation contact center may provide a contractor-centric experience wherein the contractor is prompted (or forwarded) to the customer. In that regard, the contractor may be unable to contact other contractors during the bidding process to at least partially reduce the opportunity for contractors to fix the price of bids to the customer.

The system may retrieve a contractor account based on the job creation request (step 506). For example, contact center server 220 my parse the job creation request to determine the desired contractor parameters from the job creation request. Contact center server 220 may be configured to retrieve one or more contractor accounts from database server 260 based on the desired contractor parameters. For example, contact center server 220 may be configured to retrieve all contractor accounts comprising contractor parameters that match the desired contractor parameters.

The system may transmit a pending job notification to the contractor account(s) (step 508) identified as matching the desired contractor parameters. For example, contact center server 220 may retrieve contractor contact information from database server 260 and/or directory server 250. The pending job notification may comprise customer contact information, the desired contractor parameters, the job description, and/or the like. In various embodiments, the pending job notification may also comprise a job ID, or similar unique identifier, configured to identify the job. Contact center server 220 may transmit the pending job notification to contractor system 105 associated with contractor account.

The system may receive a contractor job invoice (step 510). For example, in response to a contractor system 105 receiving the pending job notification, a contractor may review the pending job notification. In response to the contractor deciding to submit an offer to complete the job, contractor system 105 may generate and transmit the contractor job invoice to contact center generation system 110. The contractor job invoice may comprise data regarding the contractor's offer to complete the job, such as, for example, an offered price, an offered price range, a job completion timeframe, and/or the like. In various embodiments, the contractor job invoice may comprise the job ID from the pending job notification to identify the contractor job invoice as being associated with the pending job notification.

In response to receiving the contractor job invoice, the system may update the job creation contact center based on the contractor job invoice (step 512). For example, contact center server 220 may transmit the contractor job invoice to management server 240, and management server 240 may store the contractor job invoice for recordkeeping. Contact center server 220, via front end server 215, may also transmit a contractor job invoice notification to customer system 101. The contractor job invoice notification may comprise data indicating that the customer has a pending contractor job invoice for the submitted job creation request. Contact center server 220, via contact center host server 270, may update the job creation contact center to comprise the contractor contact information associated with the contractor submitting the contractor job invoice. For example, contact center server 220 may query database server 260 and/or directory server 250 to retrieve the contractor contact information. In various embodiments, wherein the job creation contact center comprises an online portal or directory listing, contact center server 220 may update the job creation contact center by adding the contractor contact information to the online portal or directory listing. In various embodiments, wherein the job creation contact center comprise an IVR system, contact center server 220 may update the IVR workflow for the job creation contact center to include the contractor phone number as a prompt in the IVR workflow.

In various embodiments, the system may transmit any number of pending job notifications in step 508, and/or may receive any number of contractor job invoices in step 510. For example, the system may transmit a first pending job notification, a second pending job notification, etc. The system may receive a first contractor job invoice, a second contractor job invoice, etc. The job creation contact center may be updated to include contractor contact information for each contractor job invoice received in the system. For example, the system may update the job creation contact center to include a first contractor contact information, a second contractor contact information, etc. Each contractor that submits a contractor job invoice may be given a contractor access code to access the job creation contact center. The contractor access codes may be unique to the contractor (e.g., first contractor is assigned a first contractor access code, second contractor is assigned a second contractor access code, etc.) or may be the same for all contractors (e.g., first contractor and second contractor are provided the same contractor access code).

Figure 6:
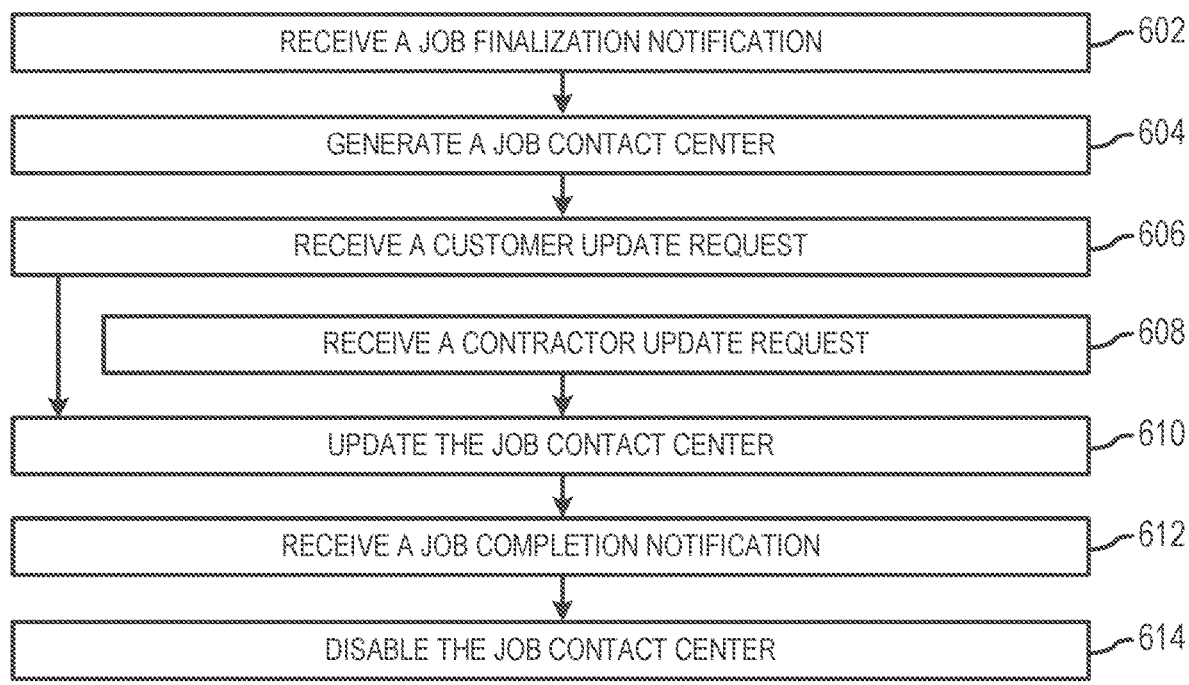
FIG. 6 illustrates a process flow for a method of generating a job contact center, in accordance with various embodiments.

In various embodiments, and with reference to FIG. 6, a method 601 for generating a job contact center is disclosed. The system may receive a job finalization notification (step 602). The job finalization notification may be received in response to the customer accepting the contractor job invoice from the contractor (e.g., in response to the customer hiring the contractor to complete the job). Customer system 101 may be configured to transmit the job finalization notification to contact center generation system 110, via front end server 215. The job finalization notification may comprise data indicating the selected contractor (e.g., contractor identifier, name, etc.), a contract between the parties, terms of the job, and/or any other suitable data regarding the contractor selection. In response to receiving the job finalization notification, front end server 215 may be configured to transmit the job finalization notification to management server 240. Management server 240 may store the job finalization notification together with similar communications made during the job creation process initiated by the customer.

The system may generate a job contact center (step 604). The job contact center may be generated to enable communications between the customer and the selected contractor (e.g., contractor employees, subcontractors, etc.). The job contact center may be generated to comprise one or more communication technologies or systems. For example, and in accordance with various embodiments, the job contact center may comprise an IVR system. As a further example, and in accordance with various embodiments, the job contact center may comprise an email system, a SMS system, a chat system, and/or any other communication system.

As an example, and in accordance with various embodiments, contact center server 220 may generate the job contact center by revising the job creation contact center to remove all contractors excepting the selected contractor. In that regard, the job contact center would only comprise the contact information of the customer and the selected contractor. In various embodiments, wherein each contractor was assigned a unique contractor access code, contact center server 220 may disable the contractor access codes of those removed contractors. In various embodiments, contact center server 220 may also disable all provided access codes and generate a new access code for the job contact center (e.g., a single access code or separate customer access codes and contractor access codes).

As a further example, and in accordance with various embodiments, contact center server 220 may generate a new job contact center and disable or delete the job creation contact center from contact center host server 270. Contact center server 220 may transmit delete or disable instructions to contact center host server 270. In response to receiving the instructions, contact center host server 270 may disable and/or delete instances of the job creation contact center. Contact center server 220 may generate the job contact center using any suitable technique. Contact center server 220 may generate the job contact center similar to the generation of the job creation contact center (e.g., step 504, with brief reference to FIG. 5).

Contact center server 220 may generate the job contact center to comprise customer contact information associated with the customer and contractor contact information associated with the selected contractor. For example, contact center server 220 may retrieve the customer contact information and/or the contractor contact information from database server 260 and/or directory server 250. In a job contact center comprising an IVR system, contact center server 220 may generate an IVR workflow for the job contact center and may include the customer phone number as a prompt in the IVR workflow.

Contact center server 220 may generate the job contact center to be secured. For example, access to the job contact center may be protected by an access code (e.g., a customer access code, a contractor access code, etc.) assigned to the job contact center. The access code may comprise any secure code capable of securing access to the job contact center. For example, wherein the job contact center comprise an online portal, the access code may comprise any suitable alphanumeric string. In various embodiments, wherein the job creation contact center comprises an IVR workflow, access to the IVR workflow may be controlled by a phone number. For example, a customer or contractor may access the job contact center by dialing the assigned phone number.

The system may receive a customer update request (step 606). The customer update request may comprise data associated with a customer interaction with the job contact center. Contact center generation system 110, via front end server 215, may be configured to receive the customer update request. For example, the customer update request may be received from customer system 101, or may be generated and received based on a customer interaction. The customer message may also be transmitted to and stored in management server 240. The customer update request may comprise a customer message, a transmitted payment notification, a customer-defined contact workflow, and/or any other data associated with a customer interaction with the job contact center.

A customer message may comprise a communication from the customer to the contractor. For example, the customer may communicate with the contractor via the job contact center. Contact center server 220, via contact center host server 270, may track and record the conversations, and store the customer message in management server 240.

The transmitted payment notification may comprise data indicating that the customer made a payment to the contractor. The transmitted payment notification may be transmitted from customer system 101 to front end server 215, and stored via contact center server 220 in management server 240. The transmitted payment notification may also be generated by contact center generation system 110 in response to the customer, via customer system 101, making the payment using the system.

The customer-defined contact workflow may comprise a customer-defined IVR workflow. Contact center server 220 may store the customer-defined IVR workflow in directory server 250 and/or may update the job contact center (step 610) to comprise the customer-defined IVR workflow. In that regard, in response to a contractor accessing the job contact center by calling the access code associated with the job contact center and selecting a prompt to contact the customer, the contractor may be automatically redirected to the customer-defined IVR workflow.

The system may receive a contractor update request (step 608). The contractor update request may comprise data associated with a contractor interaction with the job contact center. Contact center generation system 110, via front end server 215, may be configured to receive the contractor update request. For example, the contractor update request may be received from a contractor system 105, or may be generated and received based on a contractor interaction. The customer message may also be transmitted to and stored in management server 240. The contractor update request may comprise a contractor message, a job status, a received payment notification, a subcontractor contact information, a contractor-defined contact workflow, and/or any other data associated with a contractor interaction with the job contact center.

The contractor message may comprise a communication from the contractor to the customer. For example, the contractor may communicate with the customer via the job contact center. Contact center server 220, via contact center host server 270, may track and record the conversations. Contact center server 220 may store the contractor message in management server 240.

The job status may comprise data indicating the status of the job, such as, for example, a status percentage (e.g., 50% complete), a job milestone, a status timeframe (e.g., job estimated to be completed in 20 days), and/or the like. The job status may be transmitted by the contractor system 105, and may be stored by contact center server 220 in management server 240.

The received payment notification may comprise data indicating that the contractor received a payment from the customer. The received payment notification may be transmitted from a contractor system 105 to front end server 215, and stored via contact center server 220 in management server 240. The received payment notification may also be generated by contact center generation system 110 in response to the customer, via customer system 101, making the payment using the system, the system processing the payment, and the contractor receiving the payment.

The subcontractor contact information may comprise data regarding subcontractors added by the contractor to the job contact center. For example, the subcontractor contact information may comprise a business name, a contact name, address, telephone number, email address, subcontractor website, etc.), and/or the like. In response to receiving the subcontractor contact information, contact center server 220 may store the subcontractor contact information in directory server 250. Contact center server 220 may also update the job contact center (step 610) to comprise the subcontractor contact information. For example, in an IVR-based system, the subcontractor may be added to the IVR workflow as a new prompt (e.g., a subcontractor prompt). In various embodiments, a subcontractor-defined contact workflow may also be uploaded to the project contact center.

The contractor-defined contact workflow may comprise a contractor-defined IVR workflow. Contact center server 220 may store the contractor-defined IVR workflow in directory server 250 and/or may update the job contact center (step 610) to comprise the contractor-defined IVR workflow. In that regard, in response to a customer accessing the job contact center by calling the access code associated with the job contact center and selecting a prompt to contact the contractor, the customer may be automatically redirected to the contractor-defined IVR workflow.

The system may receive a job completion notification (step 612). The job completion notification may be transmitted by the customer, via customer system 101, and/or by the contractor, via a contractor system 105. The job completion notification may comprise data indicating that the job is complete, and that the job contact center may be closed. In response to receiving the job completion notification, the system may disable the job contact center (step 614). In various embodiments, the system may disable the job contact center after a waiting period, such as, for example, one week, one month, or any other desired waiting period. Contact center server 220 may be configured to disable or delete the job contact center from contact center host server 270. Contact center server 220 may transmit delete or disable instructions to contact center host server 270. In response to receiving the instructions, contact center host server 270 may disable and/or delete instances of the job contact center. In various embodiments, data, metadata, and the like associated with the job contact center may be transmitted to and stored in management server 240. Management server 240 may be configured to archive the data for any suitable period of time.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    receiving, by a computer-based system, a job creation request from a customer, wherein the job creation request comprises a customer identifier and a desired first contractor parameter for a first contractor and a desired second contractor parameter for a second contractor;
    generating, by a contact center server in the computer-based system, a job creation contact center, wherein the job creation contact center is hosted by a contact center host server in the computer-based system and comprises a customer contact information based on the customer identifier;
    transmitting to a first contractor system, by the computer-based system, a pending job notification to the first contractor, wherein the first contractor is identified based on the desired first contractor parameter; and
    transmitting to a second contractor system, by the computer-based system, a pending job notification to the second contractor, wherein the second contractor is identified based on the desired second contractor parameter;
    receiving, by the computer-based system: , a first contractor job invoice from the first contractor based on the pending job notification, and a second contractor job invoice from the second contractor based on the pending job notification; and updating, by the computer-based system, the job creation contact center to comprise a first contractor contact information associated with the first contractor and a second contractor contact information associated with the second contractor;
    wherein access to the job creation contact center is protected by a customer access code unique to the customer, a first contractor access code unique to the first contractor and differing from the customer access code, and a second contractor access code unique to the second contractor and differing from the customer access code and differing from the first contractor access code; and
    wherein the customer access code enables communications, enabled by the contact center host server, from the customer to the first contractor and from the customer to the second contractor, and wherein the first contractor access code enables communications, enabled by the contact center host server, from the first contractor to the customer and, wherein the second contractor access code enables communications, enabled by the contact center host server, from the second contractor to the customer.

2. The method of claim 1, further comprising:
    receiving, by the computer-based system, a job finalization notification in response to the customer accepting the first contractor job invoice from the first contractor and the second contractor job invoice from the second contractor; and generating, by the computer-based system, a job contact center comprising the customer contact information, the first contractor contact information, and the second contractor information.

3. The method of claim 2, further comprising receiving, by the computer-based system, at least one of a customer update request, a first contractor update request, or a second contractor update request.

4. The method of claim 3, further comprising updating, by the computer-based system, the job contact center based on the customer update request, the contractor update request, or the second contractor update request.

5. The method of claim 4, further comprising: receiving, by the computer-based system, a job completion notification in response to the first contractor completing a job for the customer or in response to the second contractor completing a job for the customer; and disabling, by the computer-based system, the job contact center with respect to the first contractor when the first contractor's job is completed or with respect to the second contractor when the second contractor's job is completed.

6. A system comprising:

a processor; and a tangible, non-transitory memory configured to communicate with the processor, the tangible, non-transitory memory having instructions stored thereon that, in response to execution by the processor, cause the processor to perform operations comprising:

receiving, from a customer system over a digital communications network:

(a) a first job creation request from a customer, wherein the first job creation request comprises a desired first contractor parameter, wherein the desired first contractor parameter includes a first job time frame and a desired first contractor location, and (b) a second job creation request from a customer, wherein the second job creation request comprises a desired second contractor parameter, wherein the desired second contractor parameter includes a second job time frame and a desired second contractor location;

transmitting, over the digital communications network to:

(a) a first contractor system, a pending job notification to a plurality of contractors in the first contractor system, wherein each of the plurality of contractors in the first contractor system contractor is identified based on a determined match with the desired first contractor parameter, and (b) a second contractor system, a pending job notification to a plurality of contractors in the second contractor system, wherein each of the plurality of contractors in the second contractor system is identified based on a determined match with the desired second contractor parameter;

receiving a first contractor job invoice from at least one of the plurality of contractors via operations of the first contractor system, and receiving a second contractor job invoice from at least one of the plurality of contractors via operations of the second contractor system;

receiving a first job finalization notification in response to the customer accepting the first contractor job invoice, and receiving a second job finalization notification in response to the customer accepting the second contractor job invoice; and generating a job contact center comprising customer contact information associated with the customer, first contractor contact information associated with the accepted first contractor, and second contractor contact information associated with the accepted second contractor.

7. The system of claim 6, wherein the job contact center comprises an interactive voice response (IVR) system.

8. The system of claim 6, wherein the job contact center comprises at least one of an email system, a short message service (SMS) system, or a chat system.

9. The system of claim 6, wherein access to the job contact center is protected by an access code unique to the customer.

10. The system of claim 6, further comprising: receiving at least one of a customer update request, a first contractor update request, or a second contractor update request; and updating the job contact center based on the customer update request, the first contractor update request, or the second contractor update request.

11. The system of claim 10, wherein the customer update request comprises at least one of a customer message, a transmitted payment notification, and a customer-defined contact workflow.

12. The system of claim 10, wherein the first contractor update request comprises at least one of a contractor message, a job status, a received payment notification, a subcontractor contact information, or a contractor-defined contact workflow, and the second contractor update request comprises at least one of a contractor message, a job status, a received payment notification, a subcontractor contact information, or a contractor-defined contact workflow.

13. The system of claim 6, wherein the desired first contractor parameter comprises at least one of a first contractor location, a first contractor rating, a first contractor specialty, and a first contractor subspecialty, and the desired second contractor parameter comprises at least one of a second contractor location, a second contractor rating, a second contractor specialty, and a second contractor subspecialty.

14. The method of claim 1 that further includes a step of authenticating, by utilizing an authentication server, customers, first contractors, and/or second contractors accessing the contact center server.

15. The system of claim 6 that further includes an authentication server configured to authenticate customers, first contractors and/or second contractors accessing the contact center server.

16. The method of claim 14, wherein the authentication server further performs the step of transmitting an authentication challenge to the customer system, the first contractor system and/or the second contractor system in order to authenticate the identity of the customer, the first contractor, and/or the second contractor.

17. The system of claim 15, wherein the authentication server is further configured to transmit an authentication challenge to the customer system, the first contractor system and/or the second contractor system in order to authenticate the identity of the customer, the first contractor, and/or the second contractor.

* * * * *